(12) United States Patent
Seehof

(10) Patent No.: US 10,139,794 B2
(45) Date of Patent: Nov. 27, 2018

(54) METHOD FOR DETERMINING A MOVEMENT LIMIT

(71) Applicant: Deutsches Zentrum fuer Luft- und Ramfahrt e.V., Cologne (DE)

(72) Inventor: Carsten Seehof, Braunschweig (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 299 days.

(21) Appl. No.: 14/941,731

(22) Filed: Nov. 16, 2015

(65) Prior Publication Data

US 2016/0139577 A1    May 19, 2016

(30) Foreign Application Priority Data

Nov. 18, 2014   (DE) ................ 10 2014 116 845

(51) Int. Cl.
| | |
|---|---|
| G05B 17/02 | (2006.01) |
| B25J 9/00 | (2006.01) |
| B25J 9/16 | (2006.01) |
| G09B 9/12 | (2006.01) |
| G01B 21/04 | (2006.01) |

(52) U.S. Cl.
CPC ............ *G05B 17/02* (2013.01); *B25J 9/003* (2013.01); *B25J 9/0009* (2013.01); *B25J 9/1615* (2013.01); *B25J 9/1623* (2013.01); *G01B 21/04* (2013.01); *G09B 9/12* (2013.01); *G05B 2219/39065* (2013.01); *G05B 2219/49278* (2013.01); *G05B 2219/50162* (2013.01)

(58) Field of Classification Search
None
See application file for complete search history.

(56) References Cited

U.S. PATENT DOCUMENTS

| | | | | |
|---|---|---|---|---|
| 2010/0279255 | A1* | 11/2010 | Williams, II | ............ G09B 9/14 434/29 |
| 2012/0029703 | A1* | 2/2012 | Veltena | .................. B25J 9/1615 700/275 |

FOREIGN PATENT DOCUMENTS

| | | |
|---|---|---|
| DE | 10 2012 103 870 A1 | 10/2013 |
| EP | 2 412 496 A1 | 2/2012 |

OTHER PUBLICATIONS

Advani, S., "The Kinematic Design of Flight Simulator Motion-Bases", Proef-schrift ter verkjging van den grad van doctor, TU Delft, 1998, pp. 109-111.

* cited by examiner

*Primary Examiner* — Asok K Sarkar
(74) *Attorney, Agent, or Firm* — W&C IP

(57) ABSTRACT

In a movement system, the movement limit is determined by having a degree of freedom of the movement system defined and the respective current movement system state being available. Subsequently, an articulation trajectory is determined for each upper articulation point of the movement system, on which articulation trajectory the articulation point can move along the degree of freedom. The movement limit is then derived by calculating the point of intersection of the actuator movement in an extreme deflection with its respective articulation trajectory.

16 Claims, 5 Drawing Sheets

METHOD FOR DETERMINING A MOVEMENT LIMIT

FIELD OF THE INVENTION

The invention relates to a method for determining a movement limit of a movement system which has a platform which can be moved in several degrees of freedom with respect to a fixed reference plane by means of actuators, wherein the actuators are arranged in an articulated fashion both in the fixed reference plane and on the movable platform and are designed to change length in order to move the movable platform. The invention also relates to a method for actuating such a movement system, to a computer program and to a device for this purpose.

BACKGROUND

By using movement simulators it is possible to simulate movements in the real world, for example movements of a vehicle, aircraft or the like. By means of such movement simulators it is possible to give a driver of the vehicle the sensation that he is actually controlling the vehicle in the real world. For example, simulators from the prior art are known in which an image projection device, which displays to the driver an image of the external surroundings of the vehicle, is arranged in the field of vision of the driver. If the driver of the vehicle simulator then carries out control tasks such as, for example, accelerating, braking or making steering inputs, depending on the control input, the image of the surroundings which is displayed on the image projection device is correspondingly adapted to the control input and changed, with the result that the driver is given the sensation of actually moving the vehicle through the external surroundings of the vehicle.

In addition to fixed simulators in which the movement of the vehicle is simulated only by the displayed image of the exterior and the change therein, simulators are also known which in addition to this have a movement system which are configured to simulate the movements and accelerations which occur within the simulation in a defined movement space. In this context, up to 6 fundamental degrees of freedom can be modeled by the movement system within the movement space, depending on the type of simulator. In particular in the case of the simulation of aircraft, movement systems are used which permit the movement of the aircraft to be modeled in all 6 degrees of freedom (3 translational and 3 rotational degrees of freedom) within the movement space.

With a few exceptions, the movement systems which are driven hydraulically or electromechanically are constructed as parallel robots, which are, in turn, most frequently arranged as a hexapod or Stewart-Gough platform. The movement system generally has actuators which have variable lengths and which can move a platform arranged on the actuators with respect to a fixed reference plane by means of a corresponding change in length of the actuators. The actuators are, for this purpose, arranged in an articulated fashion both in the reference plane and on the platform, with the result that in the case of a change in length of the actuators and an associated movement of the platform, a change in angle between the reference plane and the actuator or between the actuator and the platform is also possible.

The movement values and/or acceleration values which are acquired in the simulation by the modeling of the vehicle are modeled in the movement space of the movement system. In this context, the high-frequency components of the translational accelerations and the high-frequency components of the rotational speeds are tracked directly in the corresponding degrees of freedom. The low-frequency components of the translational acceleration are, in contrast, displayed through the tipping of the movement platform, as a result of which the apparent weight vector in the simulator cab rotates. The other location displays, the external view or instruments, which are available to the user, continue to describe the original location, with the result that the impression of a prolonged, translational acceleration is produced.

According to the current prior art, the movement values and/or acceleration values which are acquired from the simulation are converted directly into forward kinetics of the platform by a change in length of the actuators which corresponds to open-loop control without feedback of the system state. However, for feedback, the system state of the movement system has to be determined with such precise detail and high quality that closed-loop control is made possible even with the various values to be simulated. For example, DE 10 2012 103 870 A1 describes a method with which the movement system state of a movement system can be detected in real time, with the result that basically closed-loop control becomes possible.

In addition to the current movement system state of the movement system, for closed-loop control it is also necessary to know which still available movement space, starting from the current movement system state, is in the movement system in order to be able to correspondingly simulate the movement values and/or acceleration values. This is basically because, owing to its mechanical design, the simulator can model corresponding movement values and/or acceleration values only within its mechanical limit, with the result that the "simulator" system is always limited to this mechanical system limit with respect to the values to be simulated.

However, a generally valid description of the working space of a parallel robot structure is not possible owing to the mathematically ambiguous solution of forward kinematics. Sunjoo K. Advani discloses in "The Kinematic Design of Flight Simulator Motion-Bases", Phd dissertation TU Delft, 1998, an algorithm, which is valid for all degrees of freedom, for iteratively determining the system limits and the approximate description thereof by means of hyperboloids which is mathematically easy to define. In this context, the movable upper frame of the simulator is shifted virtually in one direction until the length, determined by means of inverse kinematics, of one of the six actuators infringes the mechanical system limits.

However, such an iterative, non-deterministic method for determining the system limits has the decisive disadvantage that it is basically not capable of real-time operation, since it cannot be predicted when the iterative, non-deterministic calculation method will arrive at a result. However, for basically real-time-capable closed-loop control of a simulator it is decisive that within the defined time increment for the closed-loop control the movement space limit which is required for the closed-loop control in this time increment is known, since otherwise real-time-capable closed-loop control of the simulator will no longer be possible. This cannot be provided by the iterative, non-deterministic method.

SUMMARY

The object of the present invention is therefore to specify an improved method for determining a movement limit of a movement system, with which method the movement limit can be calculated deterministically and in real time, in order thereby to be able to configure basically real-time-capable controlled-loop control while taking into account the available movement limit within a simulator.

According to one embodiment, a method for determining a movement limit of a movement system is provided, wherein the movement system has a platform which can be moved in several degrees of freedom with respect to a fixed reference plane by means of actuators. The actuators are arranged here in an articulated fashion both in the fixed reference plane and on the movable platform, with the result that each actuator has a lower and an upper articulation point. The actuators are designed to change length here, as a result of which the platform can preferably be moved in the three translational and three rotational degrees of freedom on the basis of a corresponding change in length of the actuators.

Firstly, a degree of freedom of the movement system for which the movement limit is to be determined is defined. The degree of freedom can also be defined here automatically if, for example, the superordinate closed-loop control of the simulator makes a corresponding request for the determination of the movement limit of the movement system. Furthermore, the current movement system state of the movement system is made available with respect to a predefined coordinate system, with the result that, starting from the current state of the movement system, the still remaining possible movement space can be determined with respect to the one defined degree of freedom. Subsequently, an articulation trajectory along which the upper articulation point would move when the platform moves in the direction of the defined degree of freedom is determined for each upper articulation point of the actuators, that is to say those points at which the actuators are arranged in an articulated fashion on the upper platform. The articulation trajectory therefore denotes the movement of the respective upper articulation point along the one defined degree of freedom.

During the calculation of the articulation trajectory, the current movement system state is also taken into account in the predefined coordinate system, with the result that the articulation trajectory references with respect to location and position in the predefined coordinate system.

In the next step, the maximum possible position of each upper articulation point on its calculated articulation trajectory is calculated in the direction of the defined degree of freedom, specifically as a function of an extreme deflection of the corresponding actuator of the respective upper articulation point. This is because owing to the mechanical limitation of the actuator with respect to its extreme deflection (i.e. its maximum or minimum length which the actuator can reach owing to its mechanical limit), the upper articulation point cannot reach every position on the articulation trajectory without infringing the mechanical system limits of the movement system. Since, the actuator is however also arranged in a positionally fixed and articulated fashion at the lower articulation point with respect to the predefined coordinate system, its movement space is basically limited. A point of intersection of this movement space with the articulation trajectory of the upper articulation point which is assigned to this actuator gives rise here to a maximum position which the actuator can reach in its extreme deflection on this articulation trajectory.

Subsequently, the movement limit of the movement system with respect to the defined degree of freedom is calculated as a function of the maximum possible positions of the upper articulation points on their articulation trajectories, preferably in such a way that the smallest maximum position on the respective articulation trajectory constitutes the movement limit.

Since the upper articulation points have to correspond both to the movement along the degree of freedom and to the extreme distance from the lower articulation point, the extreme positions of each articulation point are obtained from the point of intersection of the two lines. The extreme position of the entire system is then defined by the first extreme position when viewed from the current position. Therefore, the movement limit can be calculated in a deterministic and uniquely defined way on the basis of the current movement system state, with the result that such a system is basically capable of real-time operation. It can therefore be used as a basis for closed-loop control of a movement of a simulator.

The degrees of freedom of the movement system can be the translational or rotational degrees of freedom, in particular the three translational and the three rotational degrees of freedom, and quite particularly advantageously be composed of mixed forms, for example elliptical movement paths.

The current movement system state can be detected, for example, by using sensors and then correspondingly made available.

According to one advantageous embodiment, the movement system state is the location and/or position of the platform with respect to the predefined coordinate system. The location of the platform with respect to the predefined coordinate system denotes here the location of the plane which is defined by the platform, within the predefined coordinate system, while the position of the platform denotes the position in the predefined coordinate system referenced to a reference point of the platform. The reference point of the platform can constitute, for example, the center point of the platform.

In a further advantageous embodiment, the movement system state can also be the location, position and/or deflection of the actuators with respect to the predefined coordinate system. In this context, the location, position and/or deflection of the actuators are equivalent to the location and/or position of the platform with respect to the predefined coordinate system, with the result that the two values for the movement system state can be transferred one into the other (for example using forward kinematics and inverse kinematics which are known from robotics).

In one advantageous embodiment, the maximum possible position of an upper articulation point on its calculated articulation trajectory is calculated in the direction of the defined degree of freedom in that a movement space of the respective actuator with respect to its extreme deflection in the case of a movement of the actuator about the lower articulation point in the fixed reference plane is calculated, and subsequently the point of intersection of the calculated articulation trajectory of the respective upper articulation point with the movement space of the actuator is then calculated. In this context, for example the respective actuator can be considered together with its articulation trajectory in a 2-D plane which lies in the plane of the respective, looked-for degree of freedom. The articulation trajectory of the upper articulation point denotes here a distance along which the upper articulation point can be shifted in the plane in the direction of the looked-for degree of freedom. The maximum movement space of the actuator which is associated with the upper articulation point is then a circular path in the 2-D plane, around which circular path the actuator can be moved about the lower articulation point in its extreme deflection in the positionally fixed reference plane. The uppermost or lowermost point of intersection of the circular path (movement space of the actuator) with the articulation trajectory in the form of a distance then denotes the maximum position of the upper articulation point. The maximum position of the upper articulation point denotes here, in particular, that position of the upper articulation point on the articulation trajectory which the upper articulation point can reach given an extreme deflection of the actuator, that is to say therefore given minimum deflection of the actuator (smallest possible length) or a maximum deflection (largest possible length of the actuator).

The inventor has realized here that, when just a single degree of freedom is considered for the calculation of the movement space limit of the movement system, the problem can be broken down into a mathematically uniquely defined solution, since only the movement system and its possible degrees of movement now have to be considered while taking into account the current movement system state only in a 2-D plane. This gives rise, as will be shown later, to a uniquely defined calculation.

In a further advantageous embodiment, a maximum movement space of the movement system, starting from the current movement system state, can be determined on the basis of the determined movement limit in the direction of one degree of freedom. For this, firstly the movement limit is determined in one degree of freedom, with the result that, for example, two maximum limits in respectively diametrically opposite directions of the respective degree of freedom have been determined. On this basis, in each case the movement limit is now calculated for various values of this previously calculated degree of freedom on the basis of this assumed value of the previously calculated degree of freedom, with the result that various movement limits for the second calculated degree of freedom are obtained for various values of the initially calculated degree of freedom. This results then overall in a possible movement space in which the movement platform can move into the first and second degrees of freedom starting from the current movement system state.

The movement system is preferably a Stewart-Gough platform with preferably six actuators. However, other movement systems are also conceivable.

In order to actuate the movement system the current state is determined by means of sensors. Control signals which serve to actuate the actuators are then generated. The control signals are also determined here on the basis of movement limits which are obtained from the method specified above.

The control device can be, for example, a component of a simulator with a movement system and control device.

DESCRIPTION OF THE DRAWINGS

The invention will be explained by way of example with reference to the appended figures, of which.

DETAILED DESCRIPTION

Figure 1A:
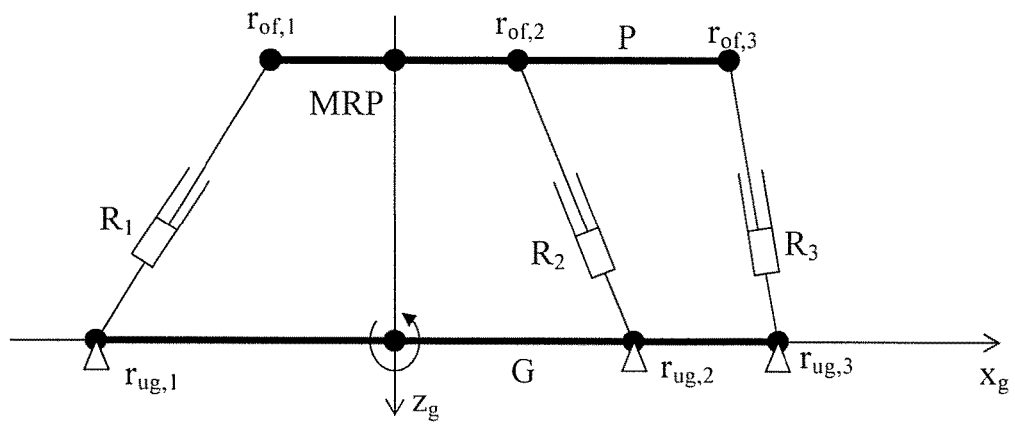
FIG. 1a shows the nomenclature of the two-dimensional equivalent model.

FIG. 1 shows the nomenclature of the two-dimensional equivalent model on the basis of three actuators. The model is composed of a frame G (underframe) which is positionally fixed and which constitutes the reference plane. A movable platform P (upper frame) is coupled by means of three actuators $R_1$, $R_2$ and $R_3$ and can be moved in three degrees of freedom by means of a change in length of the three articulation elements (actuators) $R_1$, $R_2$ and $R_3$. These three degrees of freedom are the two translational degrees of freedom x and z as well as the rotational angle theta. The articulation elements $R_1$, $R_2$ and $R_3$ can each be classified as centering sleeves whose lengths can be changed within the predefined limits.

The respective articulation points are denoted by a small "r". The lower articulation points on the frame G have here the index "u" which defines the articulation point as a lower articulation point of the respective indexed actuator. The upper articulation points correspondingly have a small "o", as a result of which the articulation point is denoted as an articulation point of the respective actuator provided on the platform P. The indices "g" and "f" define the respective coordinate system which, can, however, be respectively converted per se. The index "g" therefore means the positionally fixed coordinate system of the frame, while the index "f" denotes the vehicle-side coordinate system with respect to the movable platform P.

Therefore, the articulation point $r_{ug,1}$ denotes the lower articulation point of the actuator $R_1$, while the articulation point $r_{of,1}$ denotes the upper articulation point of the actuator $R_1$ on the platform P. The other designations for the articulation points then are obtained correspondingly.

Figure 1B:
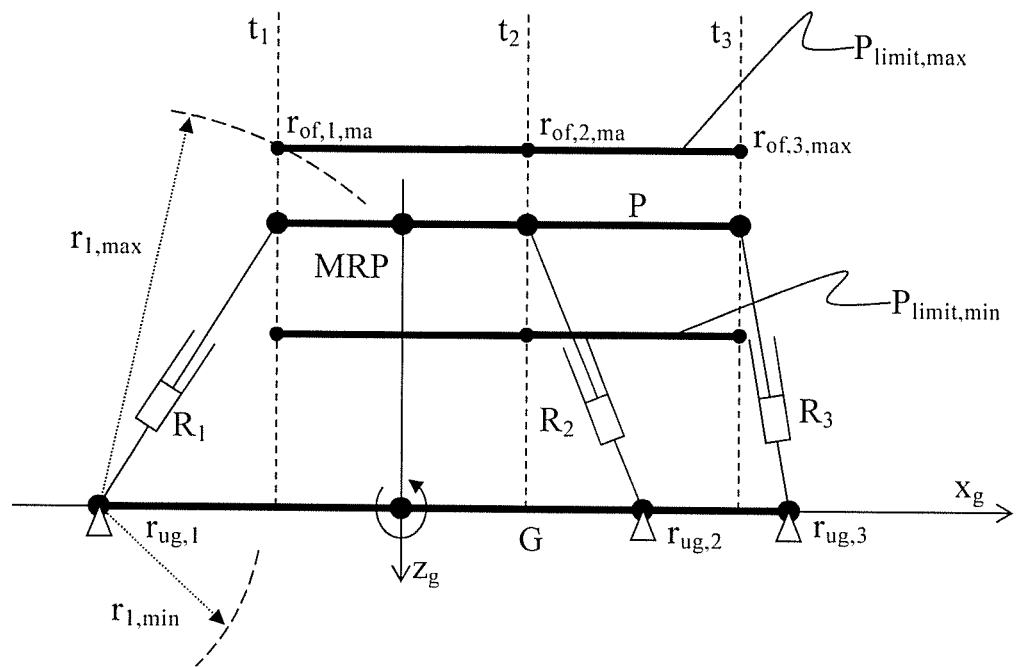
FIG. 1b shows an exemplary determination of the movement limit.

FIG. 1b shows for example the determination of the movement limit with respect to a translational degree of freedom. In the exemplary embodiment of FIG. 1b, the translational degree of freedom in the Z direction is determined, i.e. that degree of freedom at which the platform P is moved upward and downward starting from the current movement system state. The other degrees of freedom, denoted by x in the equivalent model in FIG. 1b and the rotational angle theta, remain unchanged, however.

Along the selected degree of freedom, a respective articulation trajectory $t_1$ to $t_3$ is then calculated for each upper articulation point $r_{of,1}$ to $r_{of,3}$, said articulation trajectory being obtained from the current state of the respective upper articulation point along the looked-for degree of freedom. In other words, the articulation trajectories $t_1$ to $t_3$ of the respective upper articulation points $r_{of,1}$ to $r_{of,3}$ are obtained from the looked-for degree of freedom in the Z direction, based on the current position of the upper articulation points with respect to the fixed coordinate system of the frame G.

The articulation trajectories $t_1$ to $t_3$ denote here that distance along which the respective articulation points move if the platform P is moved in the looked-for degree of freedom in the Z direction. The upper articulation points can only assume positions here in the respective articulation trajectories $t_1$ to $t_3$ if the platform P is moved along the selected degree of freedom in the Z direction. Other positions outside the articulation trajectory are not possible in the equivalent model.

In the next step, a movement space is calculated for each actuator with respect to an extreme deflection. FIG. 1b is intended to explain this briefly with respect to the actuator $R_1$. The actuator $R_1$ can reach a total of two extreme deflections here, specifically a maximum deflection at which the actuator $R_1$ has its maximum length, and a minimum deflection at which the actuator $R_1$ has the shortest length.

Owing to the fact that the actuator $R_1$ is arranged in an articulated fashion at the lower articulation point $r_{ug,1}$, a total of two movement spaces in which the actuator $R_1$ can lie in its respective maximum deflection are obtained for the two extreme deflections of the actuator $R_1$. The movement space describes here a circular path in the 2-D equivalent model. Therefore, a circular movement space $B_{max}$ is defined for the extreme deflection, while in the case of a minimum deflection the movement space $B_{min}$ is defined. The circular movement space $B_{max}$ has here a radius $r_{1,max}$, which corresponds to the maximum deflection of the actuator $R_1$. The movement space $B_{min}$ has a radius $r_{1,min}$ which corresponds to the minimum length of the actuator.

The point of intersection with the maximum movement space $B_{max}$ of the actuator $R_1$ with the articulation trajectory $t_1$ yields here the maximum position along the looked-for degree of freedom z which the actuator can move to on the articulation trajectory $t_1$. In the downward direction there is no restriction owing to the lack of a point of intersection of the movement space $B_{min}$ with the trajectory $t_1$ within the system limits. If the maximum deflection is looked for, the maximum position with respect to the articulation trajectory $t_1$ is the point of intersection with $B_{max}$, which is denoted as $r_{of,1,max}$.

The other actuators $R_2$, $R_3$ are set off against one another in a similar way, with the result that points of intersection with their respective movement spaces also are obtained here in relation to their respective articulation trajectories $t_2$, $t_3$. Both the actuator $R_2$ and the actuator $R_3$ have here points of intersection with their respective articulation trajectories which lie above the maximum possible position of the actuator $R_1$. The system limit with respect to the looked-for degree of freedom is therefore set to that maximum position which constitutes the smallest common denominator with respect to the looked-for degree of freedom. In the case of the exemplary embodiment of FIG. 1b, this is the position $r_{of,1,max}$, since this constitutes the smallest maximum position of all the actuators with their respective articulation trajectories.

The movement limit with respect to the looked-for degree of freedom is therefore the maximum position of the actuator $R_1$, with the result that the platform P can at maximum be moved as far as the limit $P_{limit,max}$. In a corresponding way, the movement limit $P_{limit,min}$, at which the actuator $R_2$ constitutes the limiting factor, is thus obtained for the minimum deflection.

If a rotational degree of freedom, for example around the rotational angle theta, is looked for instead of a translational degree of freedom, no straight articulation trajectories are obtained but instead circular trajectories which are then set off according to the same principle as in FIG. 1b. It is also conceivable in this context, to convert a plurality of degrees of freedom to one another and thereby permit, for example, ellipsoidal articulation trajectories or articulation trajectories in the form of clothoids.

If these relationships are described mathematically, a quadratic equation with a real, two-real or two conjugate-complex solutions are obtained for each actuator $R_1$ to $R_3$. In the first case, the actuator is already in an extreme location, and in the second case one of the positions cannot be arrived at by the actuator except in the case of damage, which can be ruled out during practical operation. In the third case, the movements of the actuator do not restrict the considered degree of freedom.

Figure 2:
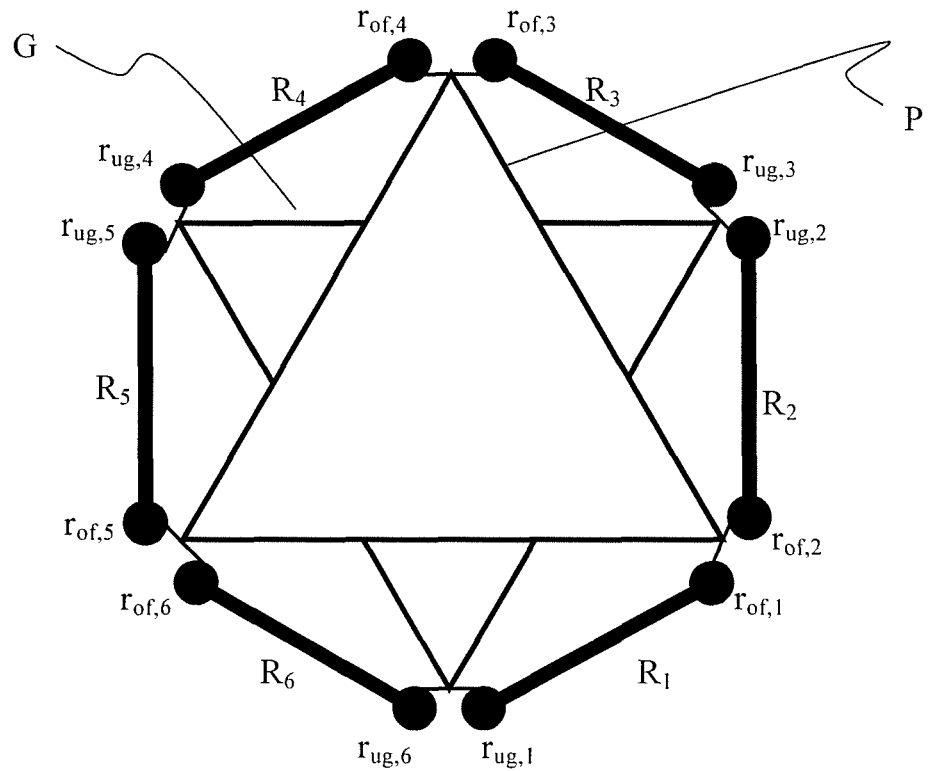
FIG. 2 shows the nomenclature of a Stewart-Gough platform.

FIG. 2 shows an overall plan view of a Steward-Gough platform in its used nomenclature. A hexapod, which can in turn be considered to be transmission, is used for mathematically describing the Steward-Gough platform. Said transmission is decomposed into the frame G as a component of the lower articulation points, into the platform P as an upper frame for receiving the upper articulation points and the sixth actuators $R_1$ to $R_6$ as transmission elements.

The frame G is permanently connected to the origin of the geodetic coordination system. For the case of a rotationally symmetrical design which is presented below, these lie in the center point of a triangle formed from the center points of the distances between three lower articulation points which are arranged in pairs. All the articulation points therefore lie on a circle whose center point coincides with the origin of the geodetic coordinate system. These assumptions are made exclusively for better comprehension and can be omitted in the case of an asymmetrical arrangement without restricting the general validity of the following statements.

Furthermore, the triangle is arranged in such a way that the tip points rearward with respect to direction of flight to be introduced later. The X axis of the geodetic coordinate system points in the direction of flight, the Y axis in the direction of flight viewed toward the right, and the Z axis according to the definition in the downward direction. The designation of the lower articulation points is made from the rear tip of the triangle in the counterclockwise direction. The lower articulation points are given the designation "r" and the indices "u" are a designation of the upper articulation points. The index "g" specifies that the articulation point is considered as described in the geodetic coordinate system.

The designation of the articulation points which are connected to the platform P is made analogously with "r" supplemented with the indices "o" for the upper articulation points and "f" for the representation in the aircraft-fixed coordinate system. Of course, these coordinate systems can be correspondingly transformed.

In the platform-fixed coordinate system, the X axis is in turn arranged in the directory of flight, the Y axis points in the direction of flight to the right and the Z axis points downward. The origin of the platform-fixed coordinate systems lies at the center point of the platform triangle P and is designated below as the motion reference (MRP).

If the lower articulation points are now connected to the respective upper articulation points, the corresponding actuators $R_1$ to $R_6$ are obtained. Figure shows the corresponding nomenclature for this.

Figure 3:
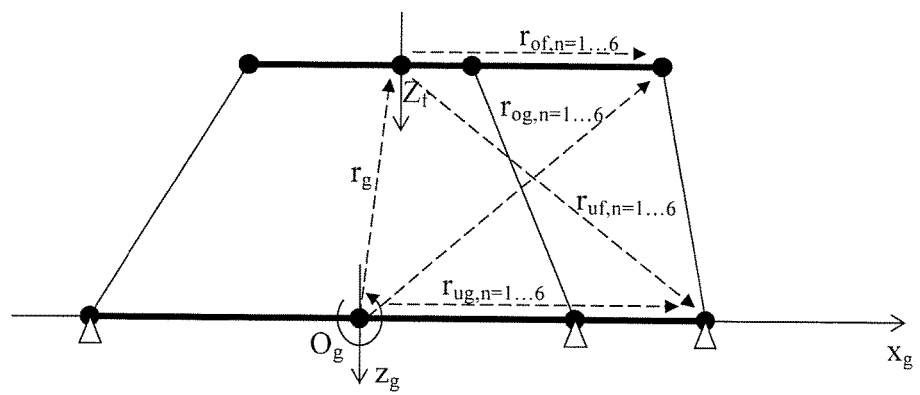
FIG. 3 shows a nomenclature of the vectors which are required for the calculation.

FIG. 3 shows the nomenclature of the vectors required for the calculation. The two problems of the forward kinematics and inverse kinematics are known from the kinematics of robots. The inverse kinematics are understood within the sense of the present invention to mean the determination of the position, speed and acceleration on the basis of the length, extension speed and extension acceleration of the actuators. In contrast, the forward kinematics is understood to mean the determination of the position, length, extension speed and extension acceleration in the case of a known position, speed and acceleration of the platform.

The vectors of the actuators for a known location of the platform P are then obtained for the forward kinematics.

$$\vec{r}_{n=1\ldots 6} = \vec{r}_g + \vec{r}_{ofg,n=1\ldots 6} - \vec{r}_{ug,n=1\ldots 6} = \vec{r}_g + \overline{M}_{gf'}$$
$$\vec{r}_{of,n=1\ldots 6} - \vec{r}_{ug,n=1\ldots 6} \qquad \text{1-1}$$

With the transformation matrix $$\overline{M}_{gf} = \begin{bmatrix} \cos\Theta\cdot\cos\Psi & \sin\Phi\cdot\sin\Theta\cdot\cos\Psi - \cos\Phi\cdot\sin\Psi & \cos\Phi\cdot\sin\Theta\cdot\cos\Psi + \sin\Phi\cdot\sin\Psi \\ \cos\Theta\cdot\sin\Psi & \sin\Phi\cdot\sin\Theta\cdot\sin\Psi + \cos\Phi\cdot\cos\Psi & \cos\Phi\cdot\sin\Theta\cdot\cos\Psi - \sin\Phi\cdot\cos\Psi \\ -\sin\Theta & \sin\Phi\cdot\cos\Theta & \cos\Phi\cdot\cos\Theta \end{bmatrix} \qquad \text{1-2}$$

so that the looked-for length of the actuators is $$l^2_{n=1...6} = r^2_{x,n=1...6} + r^2_{y,n=1...6} + r^2_{z,n=1...6} \Leftrightarrow l_{n=1...6} = \sqrt{r^2_{x,n=1...6} + r^2_{y,n=1...6} + r^2_{z,n=1...6}} \quad 1\text{-}3$$

The vector for the origin of the aircraft-fixed coordinate system to the lower articulation points is then analogously $$\vec{r}_{uf,n=1...6} = \overline{M}_{fg} \cdot (\vec{r}_g - \vec{r}_{ug,n=1...6}) = \overline{M}_{gf}^T \cdot (\vec{r}_g - \vec{r}_{ug,n=1...6})$$

$$\vec{r}_{ufg,n=1...6} = \vec{r}_g - \vec{r}_{ug,n=1...6} = \vec{r}_g - \vec{r}_{ug,n=1...6} \quad 1\text{-}4$$

For the inverse kinematics, the equations (1-1) and (1-3) give rise to a non-homogeneous equation system with 24 equations and 24 unknowns, which equation system can have up to over 40 solutions. For this reason, the position of the platform for a given actuator length is possible only by means of iterative methods which have a non-deterministic running behavior. Owing to the high number of solutions, it is therefore not possible to determine the movement space analytically by inserting the extreme values for the actuator length.

In the text which follows, it is then assumed that just one degree of freedom is always excited. In this context, the actuator which is considered is moved. It is assumed that all the other actuators can permit the movement in the degree of freedom considered. In this way, 24 extreme values are obtained for each of the six actuators. The actuator with the smallest extreme value in absolute terms then defines the limitation of the platform in this degree of freedom.

A further assumption is the transformability of all the vectors into the considered coordinate system. This requires knowledge of the location of this coordinate system. The upper equations are resolved for this purpose:

$$\vec{r}_{n=1...6} = \vec{r}_g + \vec{r}_{og} - \vec{r}_{ug} = \vec{r}_g + \overline{M}_{gf} \cdot \vec{r}_{of} - \vec{r}_{ug} \Leftrightarrow \vec{r}_{n=1...6} - \vec{r}_g + \vec{r}_{ug} = \overline{M}_{gf} \cdot \vec{r}_{of} = \vec{r}_{ofg} \quad 1\text{-}5$$

where $$\vec{r}_{ofg} = \overline{M}_{gf} \cdot \vec{r}_{of} \quad 1\text{-}6$$

$$= \begin{bmatrix} \cos\Theta\cdot\cos\Psi & \sin\Phi\cdot\sin\Theta\cdot\cos\Psi - \cos\Phi\cdot\sin\Psi & \cos\Phi\cdot\sin\Theta\cdot\cos\Psi + \sin\Phi\cdot\sin\Psi \\ \cos\Theta\cdot\sin\Psi & \sin\Phi\cdot\sin\Theta\cdot\sin\Psi + \cos\Phi\cdot\cos\Psi & \cos\Phi\cdot\sin\Theta\cdot\sin\Psi - \sin\Phi\cdot\cos\Psi \\ -\sin\Theta & \sin\Phi\cdot\cos\Theta & \cos\Phi\cdot\cos\Theta \end{bmatrix} \cdot \begin{pmatrix} r_{of,x} \\ r_{of,y} \\ r_{of,z} \end{pmatrix}$$

$$= \begin{pmatrix} (\cos\Theta\cdot\cos\Psi)\cdot r_{of,x} + (\sin\Phi\cdot\sin\Theta\cdot\cos\Psi - \cos\Phi\cdot\sin\Psi)\cdot r_{of,y} + (\cos\Phi\cdot\sin\Theta\cdot\cos\Psi + \sin\Phi\cdot\sin\Psi)\cdot r_{of,z} \\ (\cos\Theta\cdot\sin\Psi)\cdot r_{of,x} + (\sin\Phi\cdot\sin\Theta\cdot\sin\Psi + \cos\Phi\cdot\cos\Psi)\cdot r_{of,y} + (\cos\Phi\cdot\sin\Theta\cdot\sin\Psi - \sin\Phi\cdot\cos\Psi)\cdot r_{of,z} \\ (-\sin\Theta)\cdot r_{of,x} + (\sin\Phi\cdot\cos\Theta)\cdot r_{of,y} + (\cos\Phi\cdot\cos\Theta)\cdot r_{of,z} \end{pmatrix}$$

This will now be briefly outlined on the basis of a translational degree of freedom.

In the text which follows, it will be assumed that the location in the three rotational degrees of freedom is known and constant. The transformation matrix from the physically secure coordinate system to the geodetic one and therefore the description of the platform articulation points in the geodetic coordinate system are thus easily possible. Furthermore, the location of the lower articulation points is also known.

Generally, after conversion of all the vectors the desired coordinate system then is obtained from the equation (1-1)

$$\vec{r}_{A,n=1...6} = \vec{r}_{g,A} + \vec{r}_{ofA,n=1...6} - \vec{r}_{ugA,n=1...6} \Leftrightarrow$$
$$\vec{r}_{A,n=1...6} - \vec{r}_{g,A} = \vec{r}_{ofA,n=1...6} - \vec{r}_{ugA,n=1...6} \quad 1\text{-}7$$

and is noted on a component basis $$\begin{pmatrix} r_x - r_{gx} \\ r_y - r_{gy} \\ r_z - r_{gz} \end{pmatrix}_{A,n=1...6} = \begin{pmatrix} r_{ofx} \\ r_{ofy} \\ r_{ofz} \end{pmatrix}_{A,n=1...6} - \begin{pmatrix} r_{ugx} \\ r_{ugy} \\ r_{ugz} \end{pmatrix}_{A,n=1...6} \quad 1\text{-}8$$

This results in an equation system with three equations and six unknowns on the left-side. There is a fourth equation as a result of the relationship for the actuator length.

$$l_{n=1...6}^2 = r_{n=1...6,A,x}^2 + r_{n=1...6,A,y}^2 + r_{n=1...6,A,z}^2 \quad 1\text{-}9$$

A solution to this equation system is possible only with two further restrictions with respect to the variable which has been assumed to be unknown thereto. When a translation degree of freedom is considered, this leads, for example, to an equation system with four unknown equations.

If, for example, the maximum possible travel in the X direction is looked for a random location and position of the platform in the geodetic coordinate system, the equation (1-1) yields $$\vec{r}_{n=1...6} = \vec{r}_g = \overline{M}_{gf} \cdot \vec{r}_{of,n=1...6} - \vec{r}_{ug,n=1...6} \quad 1\text{-}10$$

For the known variables, the right-hand sides of the equations (1-8) are combined by means of $$a_{n=1...6} = \cos\Theta\cdot\cos\Psi\cdot r_{of,x,n=1...6} + (\sin\Phi\cdot\sin\Theta\cdot\cos\Psi - \cos\Phi\cdot\sin\Psi)\cdot r_{of,y,n=1...6} + (\cos\Phi\cdot\sin\Theta\cdot\cos\Psi + \sin\Phi\cdot\sin\Psi)\cdot r_{of,z,n=1...6} - r_{ug,x,n=1...6}$$

$$c_{n=1...6} = \cos\Theta\cdot\sin\Psi\cdot r_{of,x,n=1...6} + (\sin\Phi\cdot\sin\Theta\cdot\sin\Psi + \cos\Phi\cdot\cos\Psi)\cdot r_{of,y,n=1...6} + (\cos\Phi\cdot\sin\Theta\cdot\sin\Psi + \sin\Phi\cdot\cos\Psi)\cdot r_{of,z,n=1...6} - r_{ug,y,n=1...6}$$

$$e_{n=1...6} = -\sin\Theta\cdot r_{of,x,n=1...6} + (\sin\Phi\cdot\cos\Theta)\cdot r_{of,y,n=1...6} + (\cos\Phi\cdot\cos\Theta)\cdot r_{of,z,n=1...6} - r_{ug,z,n=1...6} \quad 1\text{-}11.$$

For the illustrative example, the movement space is to be determined in the X direction, with the result that the two other translational degrees of freedom are kept constant at the edge value. This results for the movement in the X direction in $$\vec{r}_{n=1...6} - \vec{r}_g = \quad 1\text{-}12$$

$$\overline{M}_{gf} \cdot \vec{r}_{of} - \vec{r}_{ug} \Leftrightarrow \begin{pmatrix} r_x - r_{gx} \\ r_y \\ r_z \end{pmatrix}_{n=1...6} = \begin{pmatrix} a \\ c \\ e \end{pmatrix}_{n=1...6} + \begin{pmatrix} b_x \\ d_x \\ f_x \end{pmatrix}$$

-continued where $$b_x = 0$$
$$d_x = r_{gy}$$
$$f_x = r_{gz}$$
1-13

Therefore, there is obtained, using the relationship for the length of the actuator by means of $$l^2_{n=1...6} = r^2_{x,n=1...6} + r^2_{y,n=1...6} + r^2_{z,n=1...6}$$

$$= (a_{n=1...6} + b_x + r_{gx,n=1...6})^2 +$$
$$(c_{n=1...6} + d_x)^2 + (e_{n=1...6} + f_x)^2$$

$$= (a_{n=1...6} + r_{gx,n=1...6})^2 + (c_{n=1...6} + d_x)^2 +$$
$$(e_{n=1...6} + f_x)^2 \Leftrightarrow r_{gx,1/2,n=1...6}$$

$$= -a_{n=1...6} \pm$$
$$\sqrt{l^2_{n=1...6} - (c_{n=1...6} + d_x)^2 - (e_{n=1...6} + f_x)^2}$$
1-14

Per actuator, two translational extreme positions are therefore obtained for each length which is used. If the maximum and the minimum actuator length is then used, 24 extreme values are obtained therefrom. The limit of the movement range which applies for the instantaneous location in examined coordinate direction are the points which are closest to the assumed position. The values for $$r_{y,n=1...6} = c + d_x$$
1-15 and $$r_{z,n=1...6} = e + f_x$$
1-16 can be determined directly. This is easily apparent because of the unchanged coordinates of the upper articulation points in the two degrees of freedom.

Figure 4:
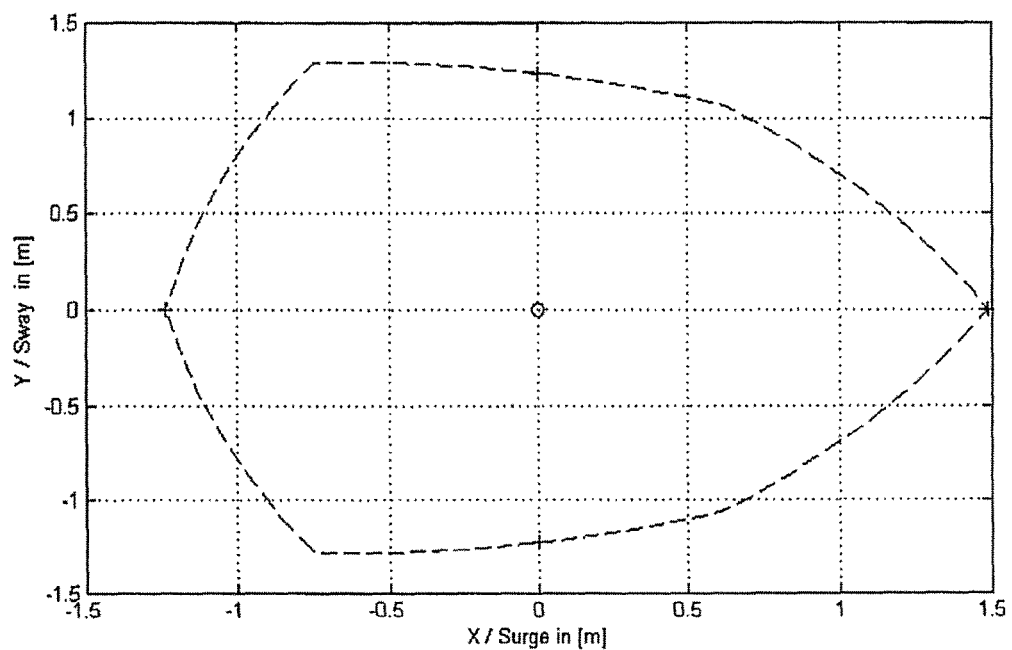
FIG. 4 shows an illustration of a two-dimensional movement space.

FIG. 4 shows as an exemplary result the movement space in the X and Y directions. For this, firstly the movement limit in the X direction, starting from the instantaneous position and location of the upper frame is calculated. The position and location of the upper frame in the example in FIG. 4 is at the coordinate origin here.

Subsequently, the movement limit in the Y direction was calculated in each case for X for various X values within the calculated movement limit, with the result that in each case different Y values are obtained for various X values. As a result, in this context the limit of the movement space which the platform can move to is obtained for Z=0 and a current position at the coordinate origin.

An advantage of this method is that this movement space can be calculated deterministically and analytically, with the result that this method is basically capable of real-time operation.

The invention claimed is:

1. A movement system for simulators configured for carrying out a method for determining a movement limit of the movement system, wherein the movement system comprises:
    a platform which can be moved in several degrees of freedom with respect to a fixed reference plane by actuators,
    wherein the actuators are arranged in an articulated fashion both in the fixed reference plane and on the movable platform and are designed to change length in order to move the movable platform, and
    microprocessor-controlled computing unit which receives information from the actuators and is configured for:
    a) defining a degree of freedom of the movement system for which the movement limit is to be determined,
    b) making available a current movement system state of the movement system with respect to a predefined coordinate system,
    c) calculating an articulation trajectory for each upper articulation point of the actuators at the movable platform along the fixed degree of freedom taking into account the current movement system state in the predefined coordinate system,
    d) calculating a maximum possible position of each upper articulation point on its calculated articulation trajectory in the direction of the defined degree of freedom as a function of an extreme deflection of the corresponding actuator of the respective upper articulation point, and
    e) calculating the movement limit of the movement system with respect to the defined degree of freedom as a function of the maximum possible positions of the upper articulation points on their articulation trajectories
    whereby the movement limit is calculated deterministically and in real time, in order to thereby configure real-time-capable controlled-loop control while taking into account the available movement limit within the movement system.

2. The movement system according to claim 1, wherein the degrees of freedom of the movement system are the translational or rotational degrees of freedom.

3. The movement system according to claim 1, wherein the current movement system state is detected by means of sensors and then made available.

4. The movement system according to claim 1, wherein the movement system state is the location and/or position of the platform with respect to the predefined coordinate system.

5. The movement system according to claim 1, wherein the movement system state is the location, position and/or deflection of the actuators with respect to the predefined coordinate system.

6. The movement system according to claim 1, wherein the maximum possible position of an upper articulation point on its calculated articulation trajectory is calculated in the direction of the defined degree of freedom in that a movement space of the respective actuator with respect to its extreme deflection in the case of a movement of the actuator about the lower articulation point in the fixed reference plane is calculated, and the point of intersection of the calculated articulation trajectory of the respective upper articulation point with the movement space of the actuator is calculated.

7. The movement system according to claim 1, wherein the movement limit is determined for a first defined degree of freedom of the movement system, wherein subsequently in each case the movement limit for a second defined degree of freedom is calculated for various assumed values of the first defined degree of freedom within the movement limit, in order to obtain the movement limit for a movement space which is defined by the first and second degrees of freedom.

8. The movement system according to claim 1, wherein the movement system is a Stewart-Gough platform.

9. The movement system of claim 8, wherein said Stewart-Gough platform has six actuators.

10. A non-transitory computer-readable medium containing computer instructions stored therein for causing the microprocessor controlled computing unit to perform steps a) through e) of claim 1.

11. Device for determining a movement limit of a movement system, the movement system having a platform which can be moved in several degrees of freedom with respect to a fixed reference plane by means of actuators, wherein the actuators are arranged in an articulated fashion both in the fixed reference plane and on the movable platform and are designed to change length in order to move the movable platform, the device configured for carrying out the method according to claim 1.

12. Method for actuating a movement system in order to simulate movements and/or accelerations, wherein the current movement system state of the movement system is detected by means of sensors, and control signals for actuating the actuators of the movement system in order to simulate a movement and/or an acceleration are generated, wherein the control signals are generated as a function of the current movement system state and a determined movement limit of the movement system, wherein the movement limit of the movement system is calculated in accordance with the method according to claim 1.

13. A non-transitory computer-readable medium containing computer instructions stored therein for causing the microprocessor controlled computing unit to perform the method according to claim 12.

14. Control device for actuating a movement system, which control device is configured for carrying out the method according to claim 12.

15. Simulator for simulating movements and/or accelerations with a movement system and a control device according to claim 14.

16. Method for determining a movement limit of a movement system with simulator for carrying out a method, wherein the movement system comprises:
- a platform which can be moved in several degrees of freedom with respect to a fixed reference plane by actuators,
- wherein the actuators are arranged in an articulated fashion both in the fixed reference plane and on the movable platform and are designed to change length in order to move the movable platform, and
- a microprocessor-controlled computing unit which receives information from the actuators, the method comprising:
a) defining a degree of freedom of the movement system for which the movement limit is to be determined,
b) making available a current movement system state of the movement system with respect to a predefined coordinate system,
c) calculating an articulation trajectory for each upper articulation point of the actuators at the movable platform along the fixed degree of freedom taking into account the current movement system state in the predefined coordinate system,
d) calculating a maximum possible position of each upper articulation point on its calculated articulation trajectory in the direction of the defined degree of freedom as a function of an extreme deflection of the corresponding actuator of the respective upper articulation point,
e) calculating the movement limit of the movement system with respect to the defined degree of freedom as a function of the maximum possible positions of the upper articulation points on their articulation trajectories, whereby the movement limit is calculated deterministically and in real time, and
f) configuring a real-time-capable controlled-loop control while taking into account the available movement limit within the movement system, and using the controlled-loop control for controlling the movement system.

* * * * *